(12) United States Patent
Ferran et al.

(10) Patent No.: US 8,965,725 B2
(45) Date of Patent: Feb. 24, 2015

(54) AUTOMATIC CALIBRATION ADJUSTMENT OF CAPACITANCE DIAPHRAGM GAUGES TO COMPENSATE FOR ERRORS DUE TO CHANGES IN ATMOSPHERIC PRESSURE

(71) Applicant: Reno Technologies, Inc., Wilmington, DE (US)

(72) Inventors: David J. Ferran, Del Mar, CA (US); Robert J. Ferran, San Diego, CA (US)

(73) Assignee: Reno Technologies, Inc., Wilmington, DE (US)

( * ) Notice: Subject to any disclaimer, the term of this patent is extended or adjusted under 35 U.S.C. 154(b) by 0 days.

(21) Appl. No.: 14/145,800

(22) Filed: Dec. 31, 2013

(65) Prior Publication Data

US 2014/0222362 A1    Aug. 7, 2014

Related U.S. Application Data

(60) Provisional application No. 61/761,222, filed on Feb. 5, 2013.

(51) Int. Cl.
| | |
|---|---|
| *G01L 9/12* | (2006.01) |
| *G01L 27/00* | (2006.01) |
| *G01L 7/08* | (2006.01) |

(52) U.S. Cl.
CPC .................................. *G01L 27/005* (2013.01)
USPC ................... 702/98; 702/47; 702/50; 702/52; 702/138; 702/189; 73/715; 73/718; 73/724

(58) Field of Classification Search
USPC ............ 702/47, 50, 52, 98, 138, 189; 73/715, 73/718, 724
See application file for complete search history.

(56) References Cited

U.S. PATENT DOCUMENTS

| | | | |
|---|---|---|---|
| 4,823,603 | A | 4/1989 | Ferran et al. |
| 5,396,803 | A | 3/1995 | Ferran |
| 5,515,711 | A | 5/1996 | Hinkle |
| 6,837,112 | B2 | 1/2005 | Ferran et al. |
| 2010/0198545 | A1* | 8/2010 | Berg et al. ........................ 702/98 |
| 2011/0271764 | A1* | 11/2011 | Lee ................................. 73/718 |
| 2013/0233086 | A1* | 9/2013 | Besling et al. .................. 73/724 |

* cited by examiner

*Primary Examiner* — Sujoy Kundu
*Assistant Examiner* — L. Anderson
(74) *Attorney, Agent, or Firm* — Jerry Turner Sewell

(57) ABSTRACT

In order to mitigate the negative effects of a change in atmospheric pressure, an improved capacitance diaphragm gauge (CDG) sensor incorporates an independent ambient atmospheric pressure sensor near the CDG sensor body. The ambient atmospheric sensor is located outside the CDG sensor body to sense the ambient atmospheric pressure surrounding the CDG sensor body. The ambient atmospheric sensor provides an output that represents the ambient atmospheric pressure. A sensor output processing circuit receives the output of the ambient atmospheric sensor as well as the output of the CDG sensor. The processing circuit utilizes the output from the ambient atmospheric pressure sensor to fine tune the CDG measurement of pressure by executing an in situ, real time, automatic calibration adjustment of the CDG.

10 Claims, 5 Drawing Sheets

AUTOMATIC CALIBRATION ADJUSTMENT OF CAPACITANCE DIAPHRAGM GAUGES TO COMPENSATE FOR ERRORS DUE TO CHANGES IN ATMOSPHERIC PRESSURE

RELATED APPLICATIONS

The present application claims the benefit of priority under 35 USC §119(e) to U.S. Provisional Application No. 61/761,222 filed on Feb. 5, 2013, which is incorporated by reference herein.

BACKGROUND OF THE INVENTION

1. Field of the Invention

The present invention is in the field of capacitance diaphragm gauges which measure pressure based on the deflection of a diaphragm.

2. Description of the Related Art

Absolute capacitance diaphragm gauges (CDGs) measure pressure by sensing the capacitance change associated with deflection of a diaphragm whereby one side of the diaphragm ("the Px side") is exposed to the pressure to be measured (Px) and the other side of the diaphragm is exposed to a sealed reference vacuum cavity in which an ultrahigh vacuum (e.g., less than $10^{-9}$ Torr) has been created prior to the sealing of the reference cavity.

The CDG measures capacitance between a diaphragm and one or more fixed electrodes housed in the reference vacuum cavity. When the pressure on the Px side of the diaphragm is higher than the pressure in the reference vacuum cavity, the diaphragm deflects in the direction of the fixed electrode (or electrodes), which increases the measured capacitance. As the pressure on the Px side of the diaphragm decreases, the pressure differential across the diaphragm diminishes and the diaphragm moves away from the fixed electrode (or electrodes) in the reference vacuum cavity, which reduces the measured capacitance.

As the pressure on the Px side of the diaphragm approaches the pressure in the reference vacuum cavity, the pressure differential across the diaphragm becomes sufficiently small as to be considered as the "zero point" for the CDG. This fixed zero point is established during the calibration of the CDG and is used as a reference in subsequent pressure measurements.

CDGs are commonly used to the measure pressure in vacuum chambers in which thin or thick films of material are deposited on a substrate. One common example of usage is to measure pressure during the deposition of materials onto the surface of silicon wafers during the fabrication of semiconductor devices. CDGs are quite useful in vacuum deposition processes that utilize multiple gasses because capacitance diaphragm gauges are highly accurate and are able to measure absolute pressure independent of gas composition.

The accuracy of the measurement of pressure by a CDG can be negatively impacted by several factors, one of which is a change in atmospheric pressure. As atmospheric pressure changes, the ambient pressure surrounding the body of the CDG sensor changes, and the force exerted on the body of the CDG sensor changes. Although the change in force on the external walls of the CDG sensor is relatively small, it may be sufficient to cause changes in the spacing between the diaphragm and the sensing electrode of electrodes. In certain CDG designs, atmospheric pressure changes can also impact the tension of the CDG diaphragm. In both cases, the result of changes in atmospheric pressure may be sufficient to degrade the accuracy of the pressure measurement performed by the CDG.

SUMMARY OF THE INVENTION

A need exists for an apparatus and a method for compensating for errors due to changes in ambient atmospheric pressure. The system disclosed and claimed herein is responsive to the need.

In order to mitigate the negative effects of a change in atmospheric pressure, an improved CDG sensor incorporates an independent ambient atmospheric pressure sensor positioned near the CDG sensor body. The independent ambient atmospheric sensor is located outside the CDG sensor body to sense the ambient atmospheric pressure surrounding the CDG sensor body. The ambient atmospheric sensor provides an output that represents the ambient atmospheric pressure. A sensor output processing circuit receives the output of the ambient atmospheric sensor as well as the output of the CDG sensor. The processing circuit utilizes the output from the ambient atmospheric pressure sensor to fine tune the CDG measurement of pressure by executing an in situ, real time, automatic calibration adjustment of the CDG.

The real time calibration during actual use is based upon data originally gathered at the time of a factory calibration of the CDG. For example, during the factory calibration, the ambient atmospheric pressure surrounding the CDG sensor body can be varied over a range of pressures expected to be encountered in a user setting. The effect of each measured pressure within the range on the output of the CDG sensor is stored. The effects at multiple pressures can be stored either in a lookup table or as a derived formula that relates the ambient pressure to the effect on the output of the CDG sensor. During actual use of the CDG sensor after installation by a user, the output of the independent atmospheric pressure sensor is used to index the lookup table or as the input to the derived formula to obtain a pressure error value to subtract from or add to the output of the CDG sensor to correct the reading for the current ambient atmospheric pressure.

An aspect in accordance with embodiments disclosed herein is a method for compensating for effects of a variable ambient atmospheric pressure surrounding a capacitance diaphragm gauge (CDG) on the measurement of an absolute pressure applied to an input of the CDG. The method comprises applying an applied absolute pressure to the input of the CDG, and generating a first pressure value representing the measured absolute pressure responsive to the applied absolute pressure. The method further comprises measuring the ambient atmospheric pressure from a pressure sensor proximate to the CDG to generate a second pressure value responsive to the ambient atmospheric pressure. The method adjusts the first pressure value by a calibration factor determined by the second pressure value to generate a third pressure value representing a calibrated absolute pressure. Preferably, the first pressure value is a first digital value, the second pressure value is a second digital value, and the third pressure value is a third digital value. In certain embodiments, the calibration factor is determined by applying a known absolute pressure to the input of the CDG, sequentially varying the ambient atmospheric pressure surrounding the CDG while monitoring the first pressure value representing the measured absolute pressure at each of a plurality of ambient atmospheric pressures, determining a difference between the measured absolute pressure and the known absolute pressure at each of the plurality of ambient absolute pressures; and generating a respective calibration factor for each of the plurality of ambient atmospheric e pressures. In certain embodiments, each respective calibration factor is stored in a lookup table indexed by the values of the ambient atmospheric pressures. In other embodiments, the calibration factors at each of the plurality of ambient atmospheric pressures are used to produce a calibration equation that generates a calibration factor in response to a measured ambient atmospheric pressure.

Another aspect in accordance with embodiments disclosed herein is an ambient atmospheric pressure compensation system for a capacitance diaphragm gauge (CDG) that generates a measured absolute pressure value in response to an applied absolute pressure on an input of the CDG, wherein the CDG is subjected to a variable external ambient atmospheric pressure. The pressure compensation system comprises a pressure measuring circuit that generates a first pressure value representing a measured value of an absolute pressure applied to an input of the CDG, and an ambient atmospheric pressure sensor that generates a second pressure value representing a measured value of the ambient atmospheric pressure proximate the outside of the CDG. The system includes a processing system that adjusts the first pressure value by a calibration factor to generate a third pressure value representing the actual absolute pressure applied to the input of the CDG. The calibration factor is selected in response to the second pressure value. In preferred embodiments, the first pressure value is a first digital value, the second pressure value is a second digital value, and the third pressure value is a third digital value. In certain embodiments, the CDG generates an analog signal that represents the measured value of the absolute pressure, and the system further includes an analog-to-digital converter that converts the analog signal to the first digital value. In certain embodiments, the processing system obtains the calibration factor from a lookup table indexed by the second pressure value. In other embodiments, the processing system calculates the calibration factor using a calibration equation wherein the second pressure value is an input variable to the calibration equation.

BRIEF DESCRIPTION OF THE DRAWINGS

Embodiments in accordance with aspects of the present invention are described below in connection with the attached drawings in which.

DETAILED DESCRIPTION OF PREFERRED EMBODIMENTS

The improvements to capacitance diaphragms are disclosed herein with respect to exemplary embodiments of a system and a method. The embodiments are disclosed for illustration of the system and the method and are not limiting except as defined in the appended claims. Although the following description is directed to a particular embodiment of a capacitance diaphragm gauge, it should be understood that the disclosed system and method can be applied to other embodiments of capacitance diaphragm gauges.

Figure 1:
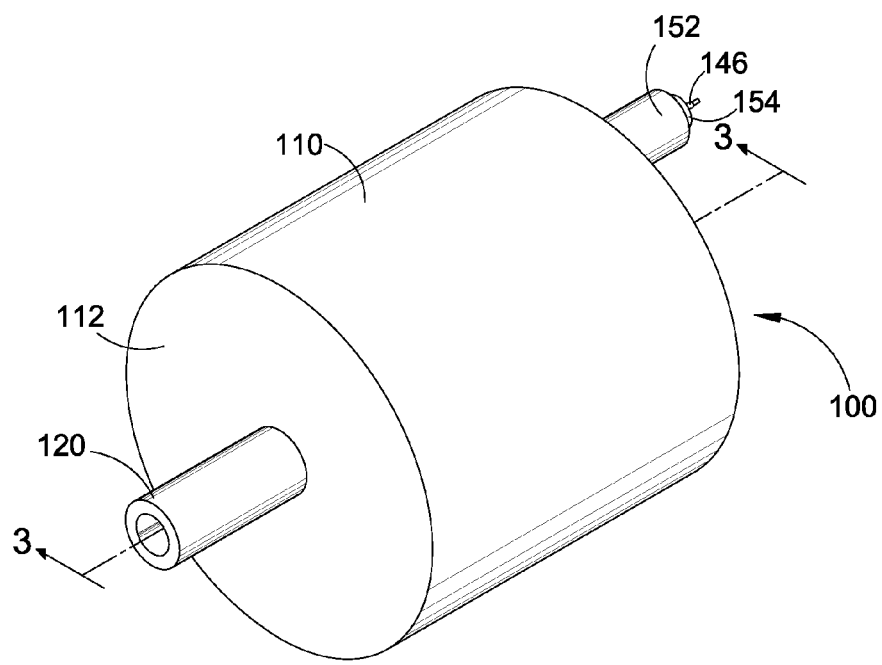
FIG. 1 illustrates a front perspective view of an exemplary capacitance diaphragm gauge (CDG), which is installable into a pneumatic system (not shown) to measure the pressure within the system.
Figure 2:
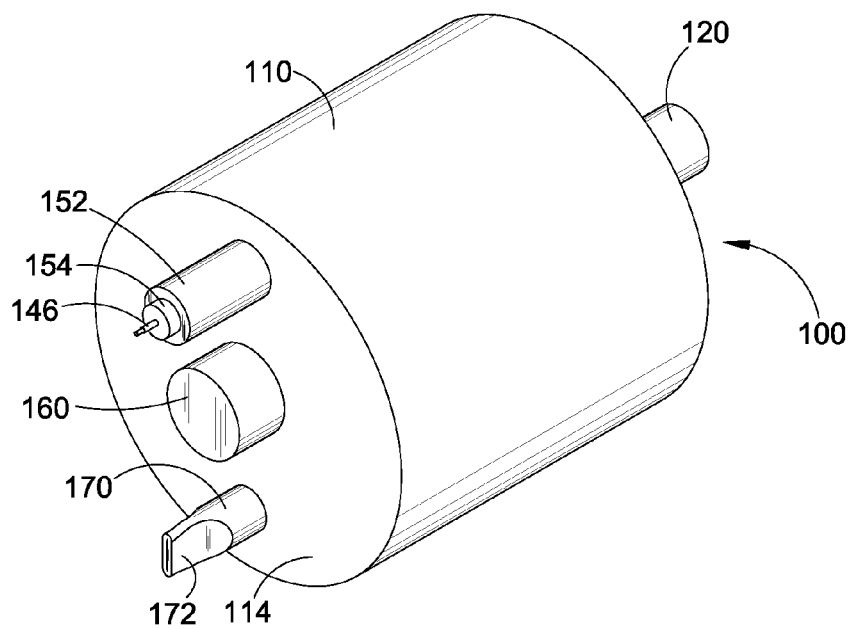
FIG. 2 illustrates a rear perspective view of the CDG of FIG. 1 which is rotated 180° from the view in FIG. 1.
Figure 3:
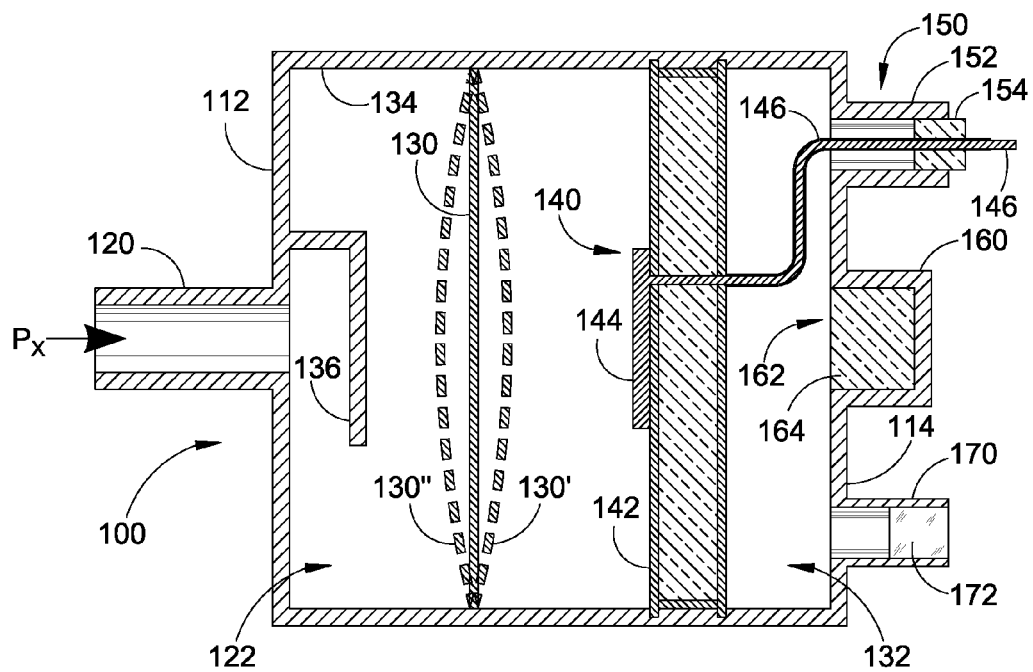
FIG. 3 illustrates a cross-sectional view of the CDG taken along the line 3-3 in FIG. 1, wherein the diaphragm appears undeflected in solid lines and appears in first and second deflected positions in dashed lines.

FIG. 1 illustrates a front perspective view of an exemplary capacitance diaphragm gauge (CDG) 100, which is installable into a pneumatic system (not shown) to measure the pressure within the system. In particular, the CDG is used to measure very low pressures resulting from evacuation of the pneumatic system. FIG. 2 illustrates a rear perspective view of the CDG of FIG. 1 which is rotated 180° from the view in FIG. 1. FIG. 3 illustrates a cross-sectional view of the CDG taken along the line 3-3 in FIG. 1.

In the illustrated embodiment, the CDG 100 comprises a hollow, generally cylindrical body structure 110, which extends between a first end surface 112 (FIG. 1) and a second end surface 114 (FIG. 2). A first cylindrical tube 120 extends from the first end surface. The first cylindrical tube provides pneumatic access to a first inner cavity 122 (FIG. 3) of the CDG. The first cylindrical tube is connectable to the pneumatic system (not shown) to allow the pressure of the system to be applied to the first inner cavity.

As shown in FIG. 2, a diaphragm 130 within the cylindrical body structure 110 separates the first inner cavity 122 from a second inner cavity 132. The diaphragm is sealed around its peripheral edges with respect to an inner surface 134 of the cylindrical body structure so that the first inner cavity is pneumatically isolated from the second inner cavity by the diaphragm. The diaphragm is also electrically connected to the cylindrical body structure, which is electrically connected to a ground reference, as discussed below.

In certain embodiments, the diaphragm 130 comprises INCONEL® alloy 750 or another suitable material. In certain embodiments, the diaphragm has a thickness that can range from approximately 0.001 inch (0.025 mm) to approximately 0.015 inch (0.38 mm). The first inner cavity 122 also includes a baffle 136 that is positioned between the diaphragm and the first cylindrical tube 120. The baffle reduces the deposition of contaminants onto the surface of the diaphragm that faces the first inner cavity.

An electrode assembly 140 is positioned within the second inner cavity 132 between the diaphragm 130 and the second end surface 114. The electrode assembly comprises a mounting structure 142, which is secured to the inner surface 134 of the cylindrical body structure 110. The mounting structure of the electrode assembly is not sealed around the peripheral edges. Accordingly, both sides of the electrode assembly are at the same pressure within the second inner cavity. At least one electrode 144 is mounted on one side of the electrode assembly mounting structure. In particular, the electrode is mounted on the side of the mounting structure that faces the diaphragm. The electrode is electrically connected through the mounting structure. A conductor 146 extends from the mounting structure to a port 150 that extends through the second end surface 114 of the cylindrical body structure 110. The port 150 includes a second cylindrical tube 152 that extends outwardly from the second end surface. The conductor extends beyond the end of the second cylindrical tube. The conductor extends through a plug 154 that hermetically seals the second cylindrical tube around the conductor.

Although described herein with respect to one electrode on the electrode assembly, one skilled in the art will appreciate that the electrode assembly may include more than one electrode. See, for example, U.S. Pat. No. 4,823,603 to Ferran et al., which discloses two concentric fixed electrodes. U.S. Pat. No. 4,823,603 is incorporated herein by reference.

In the illustrated embodiment, a central portion 160 of the second end surface 114 extends outwardly to form an extended cavity portion 162 of the second inner cavity 132. The extended portion of the second inner cavity houses a getter 164. The getter functions in a conventional manner to remove small amounts of gas that may be released by the inner surface of the second inner cavity.

A third cylindrical tube 170 extends from the second end surface 114 of the cylindrical body structure 110. Initially, the entire length of the third cylindrical tube is uniformly cylindrical. The third cylindrical tube is connected to a vacuum evacuation system (not shown) to evacuate the gases from the second inner cavity 132 to create a desired low pressure within the second inner cavity. After the evacuation process is completed, an end portion 172 of the third cylindrical tube is crimped as shown in FIG. 1 to seal the second inner cavity to maintain the evacuated condition of the second inner cavity.

As illustrated in the cross-sectional view of FIG. 3, the diaphragm 130 is a thin metallic plate that separates the first inner cavity 122 from the second inner cavity 132. As discussed above, the second inner cavity is evacuated so that the absolute pressure within the second inner cavity is very low (e.g., approximately $10^{-9}$ Torr). The pressure within the first inner cavity is determined by the pressure Px of the system (not shown) to which the first cylindrical tube 120 is connected. When the pressure within the first inner cavity is substantially equal to the pressure within the second inner cavity, the diaphragm will not be deflected and will maintain the substantially flat shape shown by the solid cross-hatched profile (labeled as 130 in FIG. 3). If the pressure Px on the system side of the diaphragm (i.e., the pressure in the first inner cavity) exceeds the pressure in the second inner cavity, the center of the diaphragm will be deflected toward the second inner cavity and the diaphragm will bow into the second inner cavity as illustrated by a first dashed cross-hatched profile 130' in FIG. 3. If the pressure Px on the system side of the diaphragm is less than the pressure in the second inner cavity, the center of the diaphragm will be deflected toward to the first inner cavity and the diaphragm will bow into the first inner cavity as illustrated by a second dashed cross-hatched profile 130" in FIG. 3. In each case, the amount of the deflection will be determined by the pressure differential between the first and second inner cavities. The amount of deflection is also determined in part by the material properties of the diaphragm (e.g., the stiffness of the diaphragm).

As is well known in the art, the diaphragm 130 forms a first, movable plate of a variable capacitor. The electrode 144 on the electrode support structure 142 forms a second, fixed plate of the variable capacitor. When the diaphragm 130 is in the undeflected initial state, the capacitance of the variable capacitor has a first (initial) value determined by the initial distance between the diaphragm and the electrode. When the pressure Px increases, the diaphragm is deflected toward the second inner cavity and thus toward the fixed electrode as illustrated by the first dashed cross-hatched profile 130'. The deflection reduces the distance between the diaphragm and the electrode, which increases the capacitance of the variable capacitor. When the pressure Px decreases, the diaphragm is deflected toward the first inner cavity and thus away from the fixed electrode as illustrated by the second dashed cross-hatched profile 130". The deflection increases the distance between the diaphragm and the electrode, which decreases the capacitance of the variable capacitor. As discussed below, the capacitance is monitored and the increases and decreases in capacitance are used to determine corresponding increases and decreases in the system pressure Px. The CDG is initially calibrated by monitoring the changes in capacitance as a plurality of known values of the pressure Px are applied to the CDG.

Figure 4:
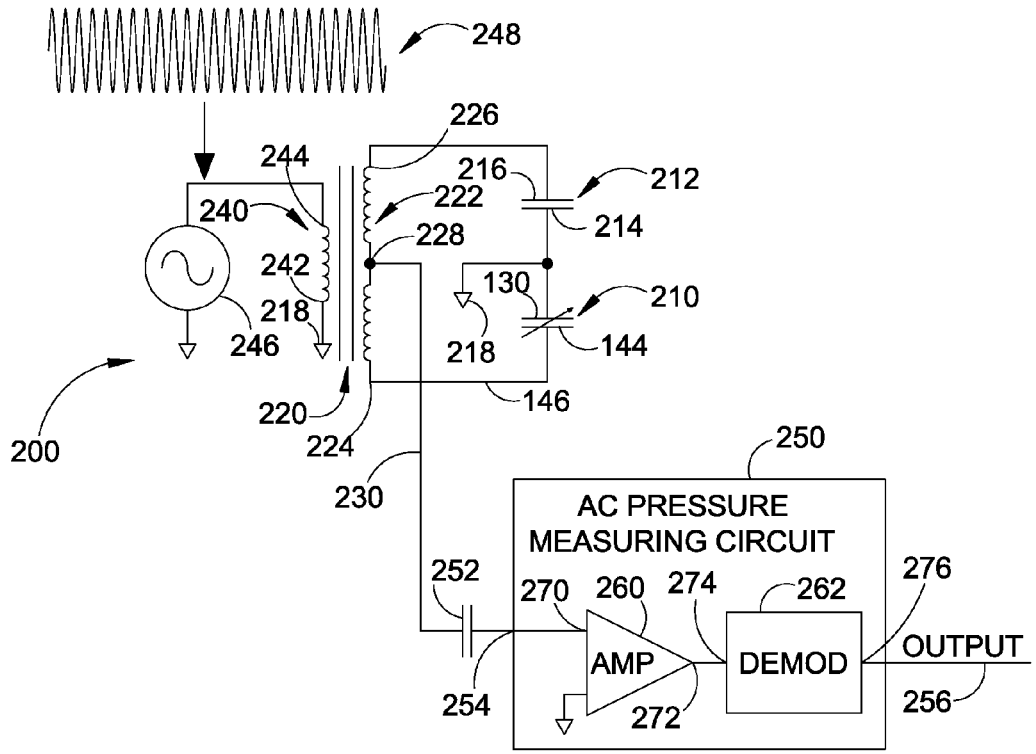
FIG. 4 illustrates a basic pressure monitoring system that monitors that the capacitance of the variable capacitor formed by the diaphragm and the fixed electrode of FIG. 3 to determine the deflection of the capacitor and thereby determine the pressure applied to the diaphragm.

FIG. 4 illustrates a simplified exemplary system 200 for monitoring the capacitance of the variable capacitor formed by the diaphragm 130 and the fixed electrode 144 of FIG. 3. The system comprises a first capacitor 210 and a second capacitor 212. The first capacitor comprises the variable capacitor formed by the diaphragm and the fixed electrode. Accordingly, a first electrode (the diaphragm) of the first capacitor is identified with the reference number 130, and a second electrode (the fixed electrode) of the first capacitor is identified with the reference number 144. The second capacitor is a conventional fixed capacitor. The second capacitor has a first electrode 214 and a second electrode 216.

The first electrode 130 of the first capacitor 210 and the first electrode 214 of the second capacitor 212 are connected to a ground reference 218. The second electrode 144 of the first capacitor is connected to a first terminal 224 of a center-tapped output (secondary) winding 222 of a transformer 220. The second electrode 216 of the second capacitor is connected to a second terminal 226 of the output winding of the transformer. A center-tap terminal 228 of the output winding of the transformer provides a signal output on a line 230.

In the illustrated embodiment, the first electrode (diaphragm) 130 of the first (variable) capacitor 210 is mechanically and electrically connected to the cylindrical body structure 110. The cylindrical body structure is electrically connected to the ground reference 218 when installed in the system having the pressure to be measured, thus providing the electrical connection of the diaphragm to the ground reference. The second electrode 144 of the first (variable) capacitor is connected to the second terminal of the transformer via the conductor 146 of FIG. 3.

In the illustrated embodiment, the capacitance of the second capacitor 212 is fixed. The capacitance of the second (fixed) capacitor is selected to be approximately equal to the initial capacitance between the diaphragm 130 and the fixed electrode 144 (e.g., the initial capacitance of the first (variable) capacitor 210) when the system pressure Px in the first inner cavity 122 is approximately equal to the pressure in the second inner cavity 132 as discussed above with respect to FIG. 3.

The transformer 220 has an input (primary) winding 240 having a first terminal 242 and a second terminal 244. The first terminal is connected to the ground reference 218. The second terminal is connected to a high frequency signal source 246 operating, for example, at a frequency of approximately 50 kilohertz as represented by an AC waveform 248.

The electrical conductor 230 connects the center tap 228 of the output winding 222 of the transformer 220 to an input 254 of an AC pressure measuring circuit 250 via an AC coupling capacitor 252. The AC pressure measuring circuit provides an output signal (OUTPUT) on an output signal line 256.

In the illustrated embodiment, the AC pressure measuring circuit 250 comprises an amplifier 260 and a demodulator 262. The signal on the center tap 228 of the output winding 222 of the transformer 220 is applied to an input 270 of the amplifier via the AC coupling capacitor 252. The amplifier preferably has a very high input impedance so that substantially zero current flows into the input of the amplifier. An output 272 of the amplifier provides an amplified output signal to an input 274 of the demodulator. An output 276 of the demodulator provides the output signal on the output signal line 256. The output signal is responsive to the variations in the capacitance of the first (variable) capacitor 210. Accordingly, the output signal varies in response to changes in the system pressure Px.

The signal generated by the high frequency signal source 246 is applied to the input (primary) winding 240 of the transformer 220. The applied signal is coupled to the secondary winding 222 and induces a high frequency voltage across the secondary winding. The induced voltage is applied across the series connection of the first (variable) capacitor 210 and the second (fixed) capacitor 212. The voltage across each capacitor is inversely proportional to the respective capacitance of the capacitor. Since the capacitance of the second (fixed) capacitor is substantially constant, the voltage across the first (variable) capacitor varies in accordance with the deflection of the diaphragm 130 caused by differential pressure across the diaphragm between the first inner cavity 122 and the second inner cavity 132 of the CDG 100. Because one electrode of each of each capacitor is electrically connected to the ground reference 218, a difference in the voltages across the two capacitors appears as a voltage differential across the output winding between the first input terminal 224 and the second input terminal 226 of the output winding of the transformer.

The voltage differential across the output winding 222 of the transformer 220 causes a voltage to appear on the center tap 228 of the output winding that is referenced to the ground reference 218 and that is proportional to the differences in the capacitance between the first (variable) capacitor 210 and the second (fixed) capacitor 212.

The voltage on the center tap 228 of the output winding 222 of the transformer 220 is applied via the conductor 230 and the AC coupling capacitor 252 to the input 270 of the amplifier 260. The amplifier amplifies the center tap voltage and provides the amplified signal as an output signal on the output 272. The output signal from the amplifier is a time-varying signal at the frequency of the signal source 246 with an amplitude that is proportional to the difference in capacitance of the first (variable) capacitor 210, which varies in response to changes in the pressure differential across the diaphragm 130. Accordingly, the amplitude of the time-varying signal output of the amplifier changes in response to changes in the pressure differential across the diaphragm.

The time-varying signal generated by the amplifier 260 is demodulated by the demodulator 262 in a conventional manner to provide the output signal on the output signal line 256 having a DC voltage level corresponding to the pressure differential across the diaphragm 130. The AC pressure measuring circuit is calibrated to equate the variations in the AC voltage to the absolute pressure (Px) applied to the diaphragm. In one embodiment, the demodulator comprises a synchronous demodulator known to the art.

Figure 5:
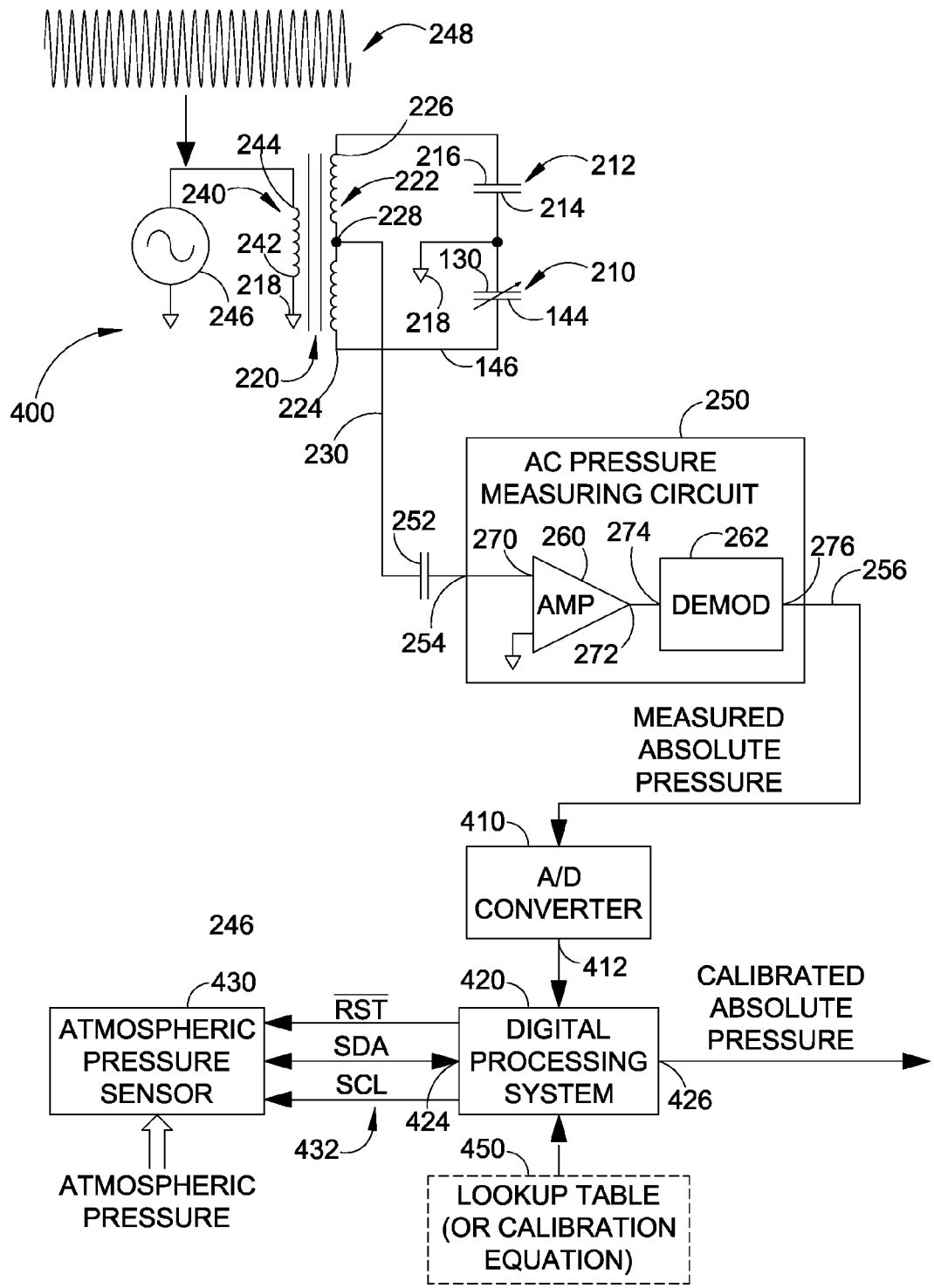
FIG. 5 illustrates an improved pressure monitoring system that compensates for the effects of changes in ambient atmospheric pressure.

FIG. 5 illustrates an improved pressure monitoring system 400 that includes circuitry that operates to compensate for the effects of differing ambient atmospheric pressures on the measured output signal from the CDG 100. The improved measurement system of FIG. 5 includes elements that are described above with respect to the system illustrated in FIG. 4. Accordingly, like elements are identified with reference numbers corresponding to the reference numbers in FIG. 4. The elements of the improved pressure monitoring system in FIG. 5 up to and including the AC pressure measuring circuit 250 are similar to the corresponding components in the previously described pressure monitoring system 200 of FIG. 4 and are not described again in detail.

In addition to the elements described above in FIG. 4, the improved pressure monitoring system of FIG. 5 includes an analog-to-digital (A/D) converter 410. An input 412 of the A/D converter receives an analog value that represents the measured absolute pressure from the AC pressure measuring circuit. The A/D converter generates a digital value on an output 414. The digital value also represents the measured absolute pressure, which may differ from the actual absolute pressure (Px) because of the effects of the ambient atmospheric pressure on the accuracy of the CDG 100.

The digital value on the output 414 of the A/D converter 410 is provided to a first input 422 of a digital processing system 420. The digital processing system has a second input 424, and generates a calibrated absolute pressure signal on an output 426.

In one embodiment, the digital processing system 420 comprises a microcontroller. In other embodiments, the digital processing system comprises an application specific integrated circuit (ASIC) configured to perform the function described below. In the illustrated embodiment, the digital processing system may also control the operation of the A/D converter 410 to determine when the A/D converter samples the analog signal and generates the digital value. It should be understood that the A/D converter may be incorporated into the digital processing system. In such embodiments, the analog output from the AC pressure measuring system 250 is provided to an analog input port of the digital processing system.

Figure 6:
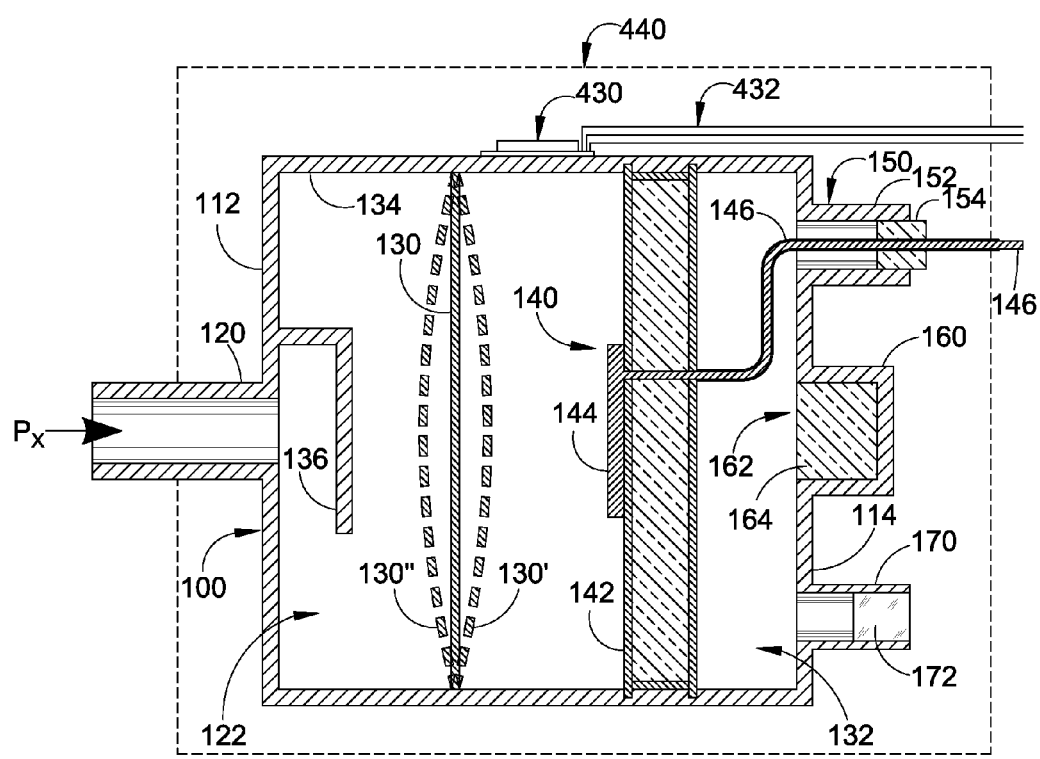
FIG. 6 illustrates a cross-sectional view of the CDG corresponding to the view of FIG. 3 that further includes an atmospheric pressure sensor.

The second input 424 of the digital processing system 420 is connected to receive an output signal from an independent atmospheric pressure sensor 430 via a set of signal lines 432. As illustrated in FIG. 6, the independent atmospheric pressure sensor is mounted in a common enclosure 440 that further encloses the CDG 100 such the independent atmospheric pressure sensor is subjected to the ambient atmospheric pressure that surrounds the body of the CDG. Accordingly, the output of the independent atmospheric pressure sensor is a signal that represents the ambient atmospheric pressure. The independent atmospheric pressure sensor is "independent" because it is not affected by the absolute pressure (Px) applied to the input of the CDG. It should be understood that the common enclosure may be a system enclosure into which the CDG is installed at a user site or the enclosure may be an enclosure into which the CDG is installed when the CDG is manufactured. In FIG. 6, the independent atmospheric pressure sensor is shown as being attached to the body of the CDG; however, the independent atmospheric pressure sensor may be installed elsewhere in the common enclosure as long as the atmospheric pressure sensor is subjected to the same pressure as the CDG.

The output of the independent atmospheric pressure sensor 430 may be an analog signal that represents the ambient atmospheric pressure or a digital signal that represents the ambient atmospheric pressure. In the former case, the digital processing system 420 includes an analog interface and performs integral analog-to-digital (A/D) conversion to convert the analog signal to a digital value. In the illustrated embodiment shown in FIG. 5, the independent atmospheric pressure sensor produces a digital value that represents the ambient atmospheric pressure. Atmospheric pressure sensors are available from many sources. One such atmospheric sensor is a MPL115A1 Miniature SPI Digital Barometer from Freescale Semiconductor, Inc., that provides the digital value on a serial peripheral interface (SPI) port, which is described in Appendix A, filed herewith. The atmospheric sensor may also be a MPL115A2 Miniature I²C Digital Barometer from Freescale Semiconductor, Inc., that provides the digital value on an Inter-Integrated Circuit (I²C) port, which is described in Appendix B, filed herewith. The contents of Appendix A and Appendix B are incorporated by reference herein. The SPI port and the I²C port are both standard serial interface ports, and the sensor is selected, for example, in accordance with the type of port available on the digital processing system. FIG. 5 illustrates an embodiment that includes the MPL115A2 I²C Digital Barometer integrated circuit. For this circuit, the serial interface includes three signal lines 432 comprising a serial clock (SCL) line, a serial data (SDA) line and a reset ($\overline{RST}$) line. Power, ground and other interconnection lines to and from the integrated circuit are not shown in FIGS. 5 and 6. The operation of the I²C interface is well known. One device (e.g., the digital processing system) operates as a master device to control data transfers between the devices. A second device (e.g., the atmospheric sensor) operates as a slave device and sends data to the master device in response to commands from the master device.

Other pressure sensors 430 from other sources and with other interface ports may also be used. For example, a pressure sensor that continuously provides an analog or digital value to the second input of the digital processing system may also be used such that the control signals from the digital processing system to the pressure sensor may not be needed.

The digital processing system 420 processes the raw digital data from the independent atmospheric pressure sensor 430 to generate an absolute value for the ambient atmospheric pressure surrounding the CDG 100. In particular, as described in more detail in the technical data sheets for the MPL115A1 and the MPL115A2 available from Freescale Semiconductor, Inc. and included herewith as Appendix A and Appendix B, respectively, the digital processing system first accesses the atmospheric pressure sensor to input a plurality of constants that are stored in the atmospheric pressure sensor when the pressure sensor is manufactured and initially calibrated. The constants are unique for each particular sensor. The digital processing system then accesses the atmospheric pressure sensor to access a first set of data that represents the pressure sensed by the atmospheric pressure sensor and to access a second set of data that represents the temperature of the atmospheric pressure sensor. The digital processing system then performs a compensation algorithm (described below) specified in the technical data sheets to determine the actual (compensated) atmospheric pressure. It should be understood that other pressure sensors from other manufacturers may provide a digital output signal or an analog output signal that represents the actual absolute pressure. When such sensors are used, the digital processing system does not have to perform the compensation algorithm specified for the pressure sensors from Freescale Semiconductor Inc.

The digital processing system 420 is responsive to the digital signal from the atmospheric pressure sensor 430 to generate a pressure correction factor to apply to the digital output from the A/D converter 410. The pressure correction factor represents the effect of the ambient atmospheric pressure on the absolute pressure readings caused by the absolute input pressure (Px). In one embodiment of the digital processing system, the effects of the ambient atmospheric pressure are stored in a lookup table 450 as pressure calibration factors. The calibration factors are indexed within the lookup table by the values of the ambient atmospheric pressure. In this embodiment, the digital processing system uses the digital value from the atmospheric pressure sensor to access the lookup table to select the calibration factor corresponding to the atmospheric pressure. The digital processing system applies the calibration factor as a correction to the measured pressure represented by the output of the A/D converter. In another embodiment, the digital processing system applies the digital value from the atmospheric pressure sensor as an input to a calibration equation that calculates the effect of the measured ambient atmospheric pressure on the measured absolute pressure (Px). The output of the equation is a calibration factor that the digital processing system applies as a correction to the measured absolute pressure to offset the effect of the ambient atmospheric pressure. The corrected absolute pressure is provided to the user as an output from the digital processing circuit.

The values for the lookup table for the first embodiment or the coefficients for the calibration equation in the second embodiment are determined during a calibration procedure that is performed on the CDG 100 by applying varying ambient atmospheric pressures to the body 110 of the CDG while maintaining the absolute input pressure (Px) applied to the input of the CDG (first cylindrical tube 120 in FIG. 6) at a known value. As the ambient atmospheric pressure is varied, the effects of the changes in atmospheric pressure on the measured values of the absolute pressure are monitored. In particular, the difference between the known absolute pressure and the measured absolute pressure are determined for each applied value of atmospheric pressure. In the first embodiment, the differences are stored as entries in the lookup table 450 using the values of the atmospheric pressure as the indices for the stored values. In the second embodiment, the effects on the measured values determined during the calibration process are used to generate a calibration equation. The calibration equation is generated by applying curve-fitting or other known techniques to the data points to produce an equation that defines the pressure differences (calibration factors) as a function of the atmospheric pressure values.

Figure 7:
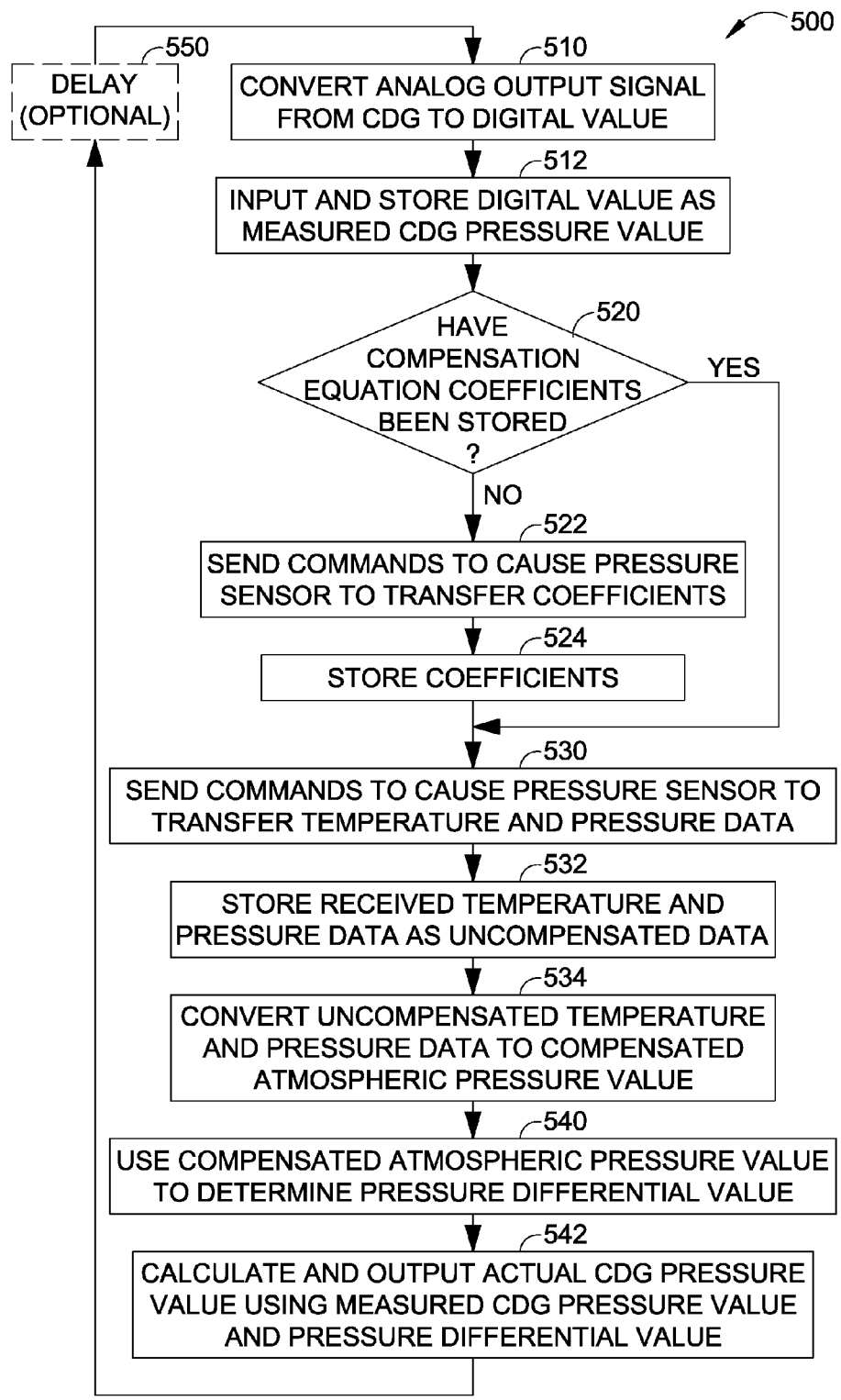
FIG. 7 illustrates a flow chart of the operation of the digital processing system of FIG. 5.

The operation of the improved pressure monitoring system 400 of FIG. 5 is illustrated by a flowchart 500 in FIG. 7, which is implemented in the digital processing system 420 of FIG. 5. The steps of the flow chart may be executed periodically or continuously in accordance with the requirements of the system. As discussed above, the digital processing system may be a microcontroller (or microprocessor), in which case, some or all of the steps of the flow chart are implemented as software instructions. The digital processing system may also be an application specific integrated circuit (ASIC), in which case, some or all of the steps are implemented by logic circuits. It should be understood that the steps may also be implemented by a combination of hardware circuits and software instructions.

The flow chart 500 in FIG. 7 begins with a step 510 in which the analog output of the AC pressure measuring circuit 250 is converted to a digital input value by the A/D converter 410. In a step 512, the digital value from the A/D converter is received by the digital processing system 420 and is stored as a measured CDG pressure value. As discussed above, in certain embodiments where the A/D converter is part of the digital processing system, the digital processing system receives the analog value directly from the AC pressure measuring circuit and converts the analog value to a digital value within the digital processing system.

The digital processing system 420 also generates appropriate command signals to the atmospheric pressure sensor 430 via the I²C reset ($\overline{RST}$), clock (SCL) and data (SDA) lines 432 to cause the atmospheric pressure sensor to send data to the input 424 of the digital processing system. For the embodiment wherein the atmospheric pressure sensor is implemented by the MPL115A2 Miniature I²C Digital Barometer from Freescale Semiconductor, Inc., or the MPL115A1 SPI Miniature Digital Barometer from Freescale Semiconductor, Inc., the digital processing system accesses the atmospheric pressure sensor at least one time to receive and store the coefficients that are used to convert the raw digital data from the atmospheric pressure sensor to compensated (actual) pressure. The first step for accessing the data from the atmospheric pressure sensor is thus shown as a decision step 520 in which the digital processing system determines whether the coefficients have already been stored. If the coefficients are not already stored, the digital processing system performs a step 522 in which it executes commands to cause the atmospheric pressure sensor to transfer the coefficient data and then performs a step 524 in which the digital processing system stores the coefficient data. The digital processing system then proceeds to a step 530. If the coefficients are already stored, the digital processing system proceeds to the step 530 directly from the decision step 520.

In the step 530, the digital processing system 420 generates the appropriate command signals on the I²C lines 432 to cause the atmospheric pressure sensor 430 to generate data representing the measured ambient temperature and pressure surrounding the CDG 100. In a step 532, the digital processing system stores the temperature and pressure data as uncompensated data. In a step 534, the digital processing system converts the uncompensated temperature and pressure data to compensated pressure data, which is stored as a compensated atmospheric pressure value. For example, the technical data sheet from Freescale Semiconductor, Inc., for the illustrated atmospheric pressure sensor defines the following compensation equation:

$$P\text{comp} = a_0 + (b_1 + (C_{12} \times T_{adc})) \times P_{adc}) + (b_2 \times T_{adc})$$

where, $a_0$ is a pressure offset coefficient;
$b_1$ is pressure sensitivity coefficient;
$b_2$ is a temperature coefficient of offset;
$c_{12}$ is a temperature coefficient of sensitivity;
$P_{adc}$ is the pressure value from the pressure sensor; and
$T_{adc}$ is the temperature value from the pressure sensor.

Other pressure sensors may be used that provide an output that is already compensated for pressure and temperature. When such pressure sensors are used, the step 534 is not required.

In a step 540, the digital processing system 420 generates a pressure differential value (calibration factor) that represents the effect of the atmospheric pressure on the pressure measured by the CDG 100. The pressure differential value may be obtained from a lookup table that is indexed by the compensated atmospheric pressure value stored in the step 534. For example, during a calibration process, the lookup table may be populated by pressure differential values that are determined by applying a fixed absolute input pressure (Px) to the input of the CDG and by varying the ambient atmospheric pressure while monitoring the digital values representing the output of the AC pressure measuring circuit 250. The pressure differential values correspond to the differences between the monitored digital values and the measured digital values at each value of the variable ambient atmospheric pressure. If the pressure differential value differs significantly with changes in temperature, the measured temperature value from the ambient atmospheric pressure sensor may also be provided as a second index to the lookup table so that the pressure differential value is a selected by a combination of the measured ambient atmospheric pressure and the measured temperature.

As an alternative to a lookup table, the pressure differential value may also be determined by a calculation wherein the compensated ambient atmospheric pressure value is an input variable to an equation that is generated to represent the relationship between the value of the ambient atmospheric pressure and the pressure differential values. The generation of a parametric equation to represent the relationship between the compensated ambient atmospheric pressure value and the pressure differential values (calibration factors). The generation of such equations using curve fitting and other techniques is well known in the art. As with the lookup table embodiment, the equation can be generated with the compensated ambient atmospheric pressure as the only input variable and can also be generated with the measured temperature from the pressure sensor as a second input variable.

In a step 542, the digital processing system 420 applies the pressure differential value from the lookup table or from the calculation to the measured CDG absolute pressure value stored in the step 512 to increase or decrease the measured CDG absolute pressure value to generate a calibrated CDG absolute pressure value. The calibrated CDG absolute pressure value corresponds to the actual absolute pressure (Px) applied to the CDG 100 via the first cylindrical tube 120 in FIG. 6. The digital processing system outputs the calibrated actual pressure value to the user (e.g., the surrounding system for which the pressure is being measured) via the output 426.

After calculating and outputting the actual pressure value, the digital processing system 420 returns to the step 510 to again input the analog input signal and to repeat the foregoing steps. The steps may be repeated continuously or the steps may be repeated on a periodic basis by having the digital processing system wait for a predetermined duration before inputting the analog input signal. The waiting is represented by an optional delay step 550; however, it should be understood that the digital processing system may be controlled by a timer set at a particular repetition rate (e.g., once per second, once per millisecond, or the like) that awakens the digital processing system or that generates an interrupt to trigger the digital processing system to exit from a wait state. The control of the timing of periodic measurement processes is well known in the art and can be accomplished in many ways.

As various changes could be made in the above constructions without departing from the scope of the invention, it is intended that all the matter contained in the above description or shown in the accompanying drawings shall be interpreted as illustrative and not in a limiting sense.

What is claimed is:

1. A method for compensating for effects of a variable ambient atmospheric pressure surrounding a capacitance diaphragm gauge (CDG) on the measurement of an absolute pressure applied to an input of the CDG, the method comprising:

applying an applied absolute pressure to the input of the CDG;

generating a first pressure value representing the measured absolute pressure responsive to the applied absolute pressure;

measuring the ambient atmospheric pressure from a pressure sensor proximate to the CDG to generate a second pressure value responsive to the ambient atmospheric pressure;

adjusting the first pressure value by a calibration factor determined by the second pressure value to generate a third pressure value representing a calibrated absolute pressure.

2. The method as defined in claim 1, wherein:

the first pressure value is a first digital value;

the second pressure value is a second digital value; and the third pressure value is a third digital value.

3. The method as defined in claim 1, wherein the calibration factor is determined by:

applying a known absolute pressure to the input of the CDG;

sequentially varying the ambient atmospheric pressure surrounding the CDG while monitoring the first pressure value representing the measured absolute pressure at each of a plurality of ambient atmospheric pressures;

determining a difference between the measured absolute pressure and the known absolute pressure at each of the plurality of ambient absolute pressures; and generating a respective calibration factor for each of the plurality of ambient atmospheric pressures.

4. The method as defined in claim 3, wherein each respective calibration factor is stored in a lookup table indexed by the values of the ambient atmospheric pressures.

5. The method as defined in claim 4, wherein the calibration factors at each of the plurality of ambient atmospheric pressures are used to produce a calibration equation that generates a calibration factor in response to a measured ambient atmospheric pressure.

6. An ambient atmospheric pressure compensation system for a capacitance diaphragm gauge (CDG) that generates a measured absolute pressure value in response to an applied absolute pressure on an input of the CDG, wherein the CDG is subjected to a variable external ambient atmospheric pressure, the pressure compensation system comprising:

a pressure measuring circuit that generates a first pressure value representing a measured value of an absolute pressure applied to an input of the CDG;

an ambient atmospheric pressure sensor that generates a second pressure value representing a measured value of the ambient atmospheric pressure proximate the outside of the CDG; and a processing system that adjusts the first pressure value by a calibration factor to generate a third pressure value representing the actual absolute pressure applied to the input of the CDG, the calibration factor selected in response to the second pressure value.

7. The system as defined in claim 6, wherein:

the first pressure value is a first digital value;

the second pressure value is a second digital value; and the third pressure value is a third digital value.

8. The system as defined in claim 7, wherein the CDG generates an analog signal that represents the measured value of the absolute pressure, and the system further includes an analog-to-digital converter that converts the analog signal to the first digital value.

9. The system as defined in claim 6, wherein the processing system obtains the calibration factor from a lookup table indexed by the second pressure value.

10. The system as defined in claim 6, wherein the processing system calculates the calibration factor using a calibration equation wherein the second pressure value is an input variable to the calibration equation.

* * * * *